United States Patent
Aoki et al.

(10) Patent No.: US 10,126,548 B2
(45) Date of Patent: Nov. 13, 2018

(54) MIRROR

(71) Applicants: KABUSHIKI KAISHA TOKAI-RIKA-DENKI-SEISAKUSHO, Aichi-ken (JP); TOKYO COSMOS ELECTRIC CO., LTD., Kanagawa-ken (JP)

(72) Inventors: Masakazu Aoki, Aichi-ken (JP); Masashi Kaji, Zama (JP)

(73) Assignees: KABUSHIKI KAISHA TOKAI-RIKA-DENKI-SEISAKUSHO, Aichi-Ken (JP); TOKYO COSMOS ELECTRIC CO., LTD, Kanagawa-Ken (JP)

( * ) Notice: Subject to any disclaimer, the term of this patent is extended or adjusted under 35 U.S.C. 154(b) by 71 days.

(21) Appl. No.: 15/003,038

(22) Filed: Jan. 21, 2016

(65) Prior Publication Data

US 2016/0214537 A1 Jul. 28, 2016

(30) Foreign Application Priority Data

Jan. 26, 2015 (JP) .................................. 2015-012417

(51) Int. Cl.
*G02B 27/00* (2006.01)
*B60R 1/06* (2006.01)

(52) U.S. Cl.
CPC ........ *G02B 27/0006* (2013.01); *B60R 1/0602* (2013.01)

(58) Field of Classification Search
CPC ...... G02B 5/08; G02B 5/0808; G02B 5/0825; G02B 5/0841; B60R 1/088; B60R 1/08; B60R 1/207
See application file for complete search history.

(56) References Cited

U.S. PATENT DOCUMENTS

2006/0181772 A1* 8/2006 Byers .................... B60R 1/088
359/512
2008/0218871 A1 9/2008 Todd et al.

FOREIGN PATENT DOCUMENTS

DE 29717005 U1 1/1998
DE 19938396 A1 3/2001
(Continued)

OTHER PUBLICATIONS

Extended European Search Report for corresponding European Patent Application No. 16152347.7 dated Jun. 27, 2016.
(Continued)

*Primary Examiner* — Darryl J Collins
*Assistant Examiner* — Journey Sumlar
(74) *Attorney, Agent, or Firm* — Roberts Mlotkowski Safran Cole & Calderon P.C.

(57) ABSTRACT

In a vehicle mirror, a heat generating body of a heater generates heat so as to heat a mirror body. A central side portion and an outer peripheral side portion of the heat generating body configure a thick portion and a thin portion, and the thin portion generates a smaller amount of heat than the thick portion, such that a heating density of the mirror body by the heat generating body is lower on an outer peripheral side portion of the mirror body than at a central side portion of the mirror body. Accordingly, the temperature of an outer peripheral portion of the mirror body can be suppressed from rising suddenly on progression from the outer peripheral side toward the central side of the mirror body, thereby enabling stress arising in the outer peripheral portion of the mirror body to be suppressed.

15 Claims, 3 Drawing Sheets

(56) References Cited

FOREIGN PATENT DOCUMENTS

| EP | 0496155 A2 | 7/1992 |
|---|---|---|
| JP | 55227384 Y1 | 6/1977 |
| JP | 56429796 U | 2/1989 |
| JP | 101301428 A | 12/1989 |
| JP | 2006-202675 | 8/2006 |

OTHER PUBLICATIONS

Japanese Office Action in related Application No. 2015-012417 dated Jul. 24, 2018.

* cited by examiner

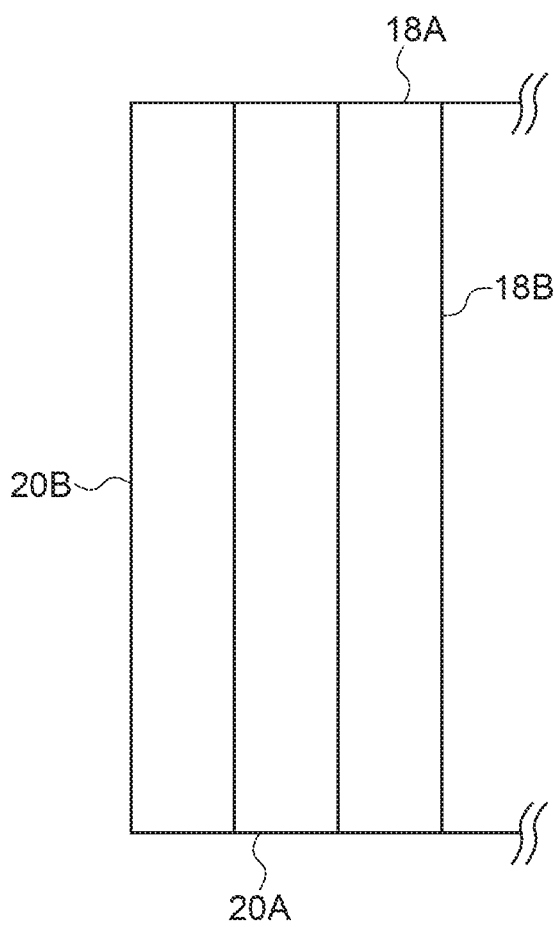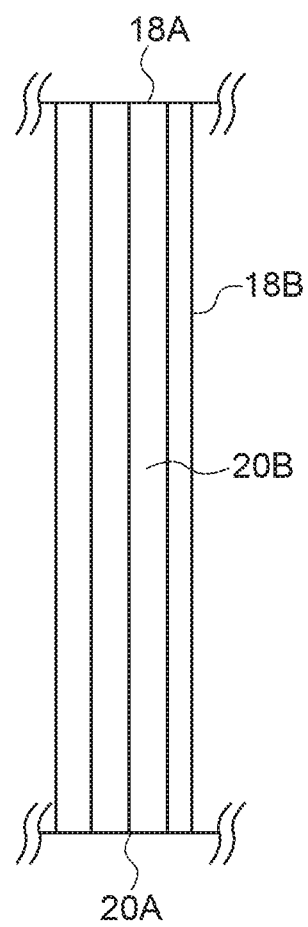

MIRROR

CROSS-REFERENCE TO RELATED APPLICATION

This application claims priority under 35 USC 119 from Japanese Patent Application No. 2015-012417 filed Jan. 26, 2015, the disclosure of which is incorporated by reference herein.

BACKGROUND

Field of the Invention

The present invention relates to a mirror in which a mirror body is heated by a heating section.

Related Art

In a heater-mirror described in Japanese Patent Application Laid-Open (JP-A) No. 2006-202675, a resistance heating element is disposed on a back face of a front surface mirror, and the resistance heating element generates heat to heat the front surface mirror.

In such heated mirrors, it is desirable to be able to suppress stress from arising at an outer peripheral portion of the front surface mirror.

SUMMARY

In consideration of the above circumstances, a mirror capable of suppressing stress from arising at an outer peripheral portion of a mirror body is obtained.

A mirror of a first aspect includes: a plate shaped mirror body; and a heating section that is configured to heat a heated region in a plate face of the mirror body, wherein a heating density in the heated region of the mirror body is lower at an outer peripheral side of the mirror body than at a central side of the mirror body.

A mirror of a second aspect is the mirror of the first aspect, further including a heat generation body that is provided at the heating section, and that generates heat so as to enable heating of the heated region of the mirror body, wherein, in the heated region of the mirror body, a cross-sectional area of the heat generation body is changed (varied) so as to change the heating density of the heating section.

A mirror of a third aspect is the mirror of either the first aspect or the second aspect, further including: (a heat generation body that is provided at the heating section; and) a pair of electrodes that are provided at the heating section, and that supply current to the heat generation body such that the heat generation body generates heat and heats the heated region of the mirror body, wherein the pair of electrodes have a space therebetween in the heated region of the mirror body, the space being changed (varied) so as to change an amount of heat generated by the heat generation body.

A mirror of a fourth aspect is the mirror of any one of the first aspect to the third aspect, wherein, in the heated region of the mirror body, the heating density of the heating section gradually decreases on progression from the central side of the mirror body toward the outer peripheral side of the mirror body.

In the mirror of the first aspect, the heating section is capable of heating the heated region (a region to be heated) of the plate face of the mirror body.

Even when the heating section heats the heated region of the mirror body, heat escapes through outer peripheral end faces of the mirror body at an outer peripheral edge portion of the mirror body, such that the temperature does not readily rise.

Note that in the heated region of the mirror body, the heating density of the heating section (the amount of heating per unit surface area) is lower at the outer peripheral side of the mirror body than at the central side of the mirror body. Accordingly, the temperature of the outer peripheral portion of the mirror body can be suppressed from rising suddenly on progression from the outer peripheral side toward the central side of the mirror body when the heating section has heated the heated region of the mirror body, thereby enabling stress arising in the outer peripheral portion of the mirror body to be suppressed.

In the mirror of the second aspect, the heat generation body of the heating section generates heat so as to enable heating of the heated region of the mirror body.

In the heated region of the mirror body (in a region at the heating section, corresponding to the heated region of the mirror body), the cross-sectional area of the heat generation body is changed so as to change the heating density of the heating section. The heating density of the heating section can accordingly be easily changed.

In the mirror of the third aspect, in the heating section, the pair of electrodes supply current to the heat generation body such that the heat generation body generates heat and heats the heated region of the mirror body.

In the heated region of the mirror body, the spacing of the pair of electrodes is changed so as to change the amount of heat generated by the heat generation body. The heating density of the heating section can accordingly be easily changed.

In the mirror of the fourth aspect, in the heated region of the mirror body, the heating density of the heating section gradually decreases on progression from the central side of the mirror body toward the outer peripheral side of the mirror body. Accordingly, the temperature of the outer peripheral portion of the mirror body can be suppressed from rising suddenly on progression from the outer peripheral side toward the central side of the mirror body when the heating section has heated the heated region of the mirror body, thereby enabling stress arising in the outer peripheral portion of the mirror body to be effectively suppressed.

BRIEF DESCRIPTION OF THE DRAWINGS

Exemplary embodiments will be described in detail with reference to the following figures, wherein:

FIGS. 3A and 3B are face-on views illustrating electrodes of a vehicle mirror according to a modified exemplary embodiment, as viewed from the mirror-viewing side.

DETAILED DESCRIPTION

First Exemplary Embodiment

Figure 1:
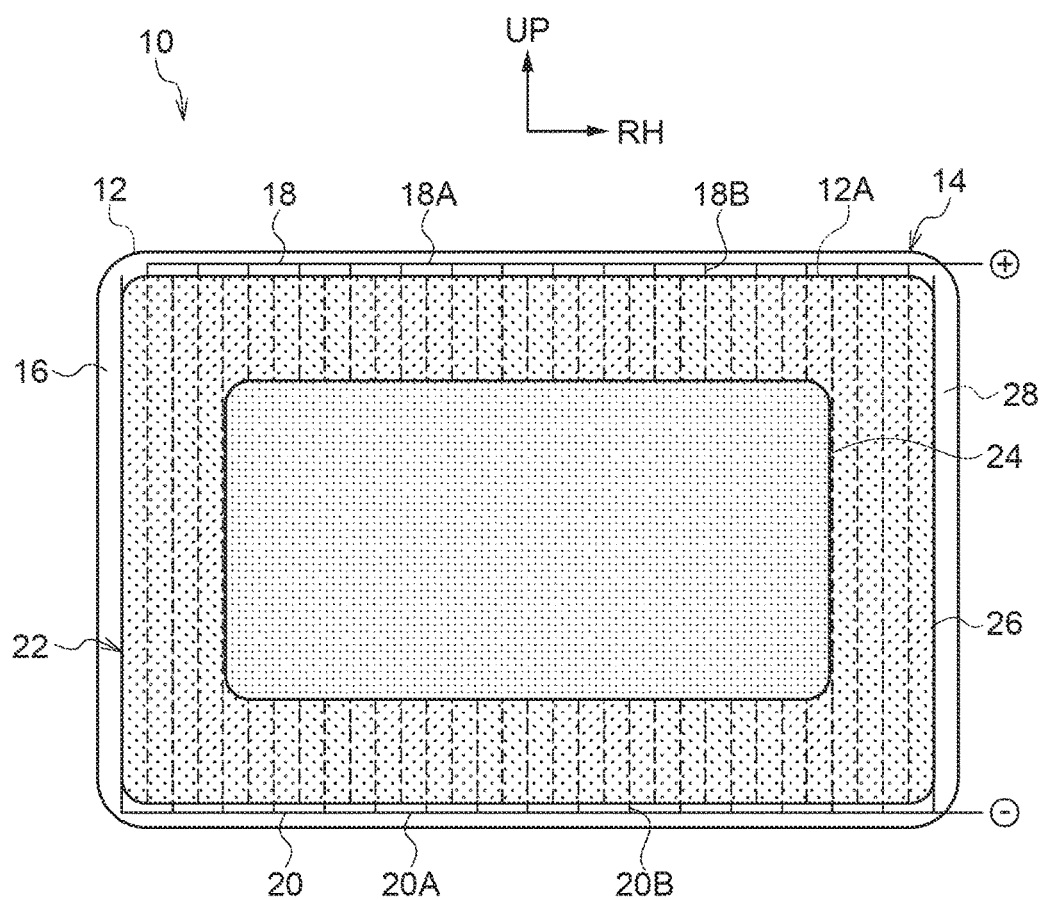
FIG. 1 is a face-on view illustrating a vehicle mirror according to a first exemplary embodiment, as viewed from the mirror-viewing side.

FIG. 1 is a face-on view illustrating a vehicle mirror 10, serving as a mirror according to a first exemplary embodiment of the present invention, as viewed from the mirror-viewing side (front side of the vehicle mirror 10). In the drawings, the arrow UP indicates upwards, and the arrow RH indicates the right.

The vehicle mirror 10 according to the present exemplary embodiment is provided at a vehicle, and for example, the vehicle mirror 10 is installed to a door (in particular, a side door), and is disposed at the exterior of the vehicle.

As illustrated in FIG. 1, the vehicle mirror 10 includes a rectangular plate shaped mirror body 12. A mirror-viewing side of the mirror body 12 is provided with a rectangular plate shaped glass plate, made from glass, as a substrate (base plate). The glass plate is transparent, and is capable of transmitting light. The entire back face of the glass plate is provided with a rectangular layer shaped reflective layer. The reflective layer is capable of reflecting light transmitted through the glass plate toward the glass plate side.

A heater 14 that is rectangular shaped as viewed face-on (in plan view), and that serves as a heating section, is fixed to an entire back face (plate face) of the mirror body 12 (the entire back face of the reflective layer).

A rectangular film shaped film 16, serving as a base body, is provided at a back side of the heater 14. The film 16 covers the entire back face of the mirror body 12.

A metal first electrode 18 (for example, a positive electrode) and a metal second electrode 20 (for example, a negative electrode) are provided at a front face of the film 16, as electrodes.

The first electrode 18 and the second electrode 20 are respectively provided with a first base portion 18A and a second base portion 20A. The first base portion 18A extends in a left-right direction at a position at an upper edge portion of the film 16. The second base portion 20A extends in the left-right direction at a position at a lower edge portion of the film 16.

The first electrode 18 and the second electrode 20 are respectively provided with plural first extension portions 18B and plural second extension portions 20B. The first extension portions 18B extend downward from the first base portion 18A of the first electrode 18 to the vicinity of the second base portion 20A, which is at an upper side of the second base portion 20A of the second electrode 20. The second extension portions 20B extend upward from the second base portion 20A of the second electrode 20 to the vicinity of the first base portion 18A, which is at a lower side of the first base portion 18A of the first electrode 18. The first extension portions 18B and the second extension portions 20B are disposed parallel to each other, and are respectively disposed at uniform spacings (intervals) therebetween in the left-right direction. A gap dimension between the respective first extension portions 18B and the respective second extension portions 20B (the minimum gap dimension in the left-right direction) is the same at every position in the left-right direction and in the up-down direction.

The mirror-viewing side of the film 16 is, except for at an entire outer peripheral edge portion, provided with a rectangular film shaped heat generating body 22 (heating body). The heat generating body 22 is formed by coating the front faces of the film 16, the first electrode 18, and the second electrode 20. An upper end of the heat generating body 22 is aligned with the up-down direction position of upper ends of the second extension portions 20B of the second electrode 20 (or may be disposed at the lower side thereof), namely, the position of the upper end of the heat generating body 22 is as the same as the positions of the upper ends of the second extension portions 20B of the second electrode 20 in the up-down direction. Further, a lower end of the heat generating body 22 is aligned with the up-down direction position of lower ends of the first extension portions 18B of the first electrode 18 (or may be disposed at the upper side thereof), namely, the position of the lower end of the heat generating body 22 is as the same as the positions of the lower ends of the first extension portions 18B of the first electrode 18 in the up-down direction. The heat generating body 22 is, for example, a positive temperature coefficient PTC) resistor, and the heat generating body 22 generates heat on being supplied with current, with the amount of heat generated increasing as the supplied current increases.

A central side portion of the heat generating body 22 configures a rectangular shaped thick portion 24, as viewed face-on, and an outer peripheral side portion (a portion at outer side than the central side portion) of the heat generating body 22 (a portion other than the thick portion 24) configures a rectangular frame shaped thin portion 26, as viewed face-on. The thin portion 26 is, for example, configured by the number of times of coating on the mirror-viewing side of the film 16 being fewer at the thin portion 26 than at the thick portion 24, and is configured with a smaller thickness dimension than the thick portion 24. The thin portion 26 is accordingly configured with a smaller cross-sectional area perpendicular to the left-right direction than the thick portion 24.

The first base portion 18A of the first electrode 18 and the second base portion 20A of the second electrode 20 are electrically connected to a power source (not illustrated in the drawings), and the power source applies a voltage between the first electrode 18 and the second electrode 20, thereby supplying current to the heat generating body 22 between the first extension portions 18B of the first electrode 18 and the second extension portions 20B of the second electrode 20, such that the heat generating body 22 generates heat. This thereby enables the heat generating body 22 to heat the mirror body 12 from the back side. A region on the back face (plate face) of the mirror body 12, which encloses a heat generating portion(s) of the heat generating body 22 (a region inside the outer periphery of the heat generating body 22 on the back face (plate face) of the mirror body 12) configures a heated region 12A of the mirror body 12.

A rectangular film shaped cover 28, serving as a covering member, is provided at a mirror-viewing side of the heat generating body 22. The cover 28 covers, from the mirror-viewing side, the film 16, the first electrode 18 (a portion of the first base portion 18A where it is disposed on the film 16, and the first extension portions 18B), the second electrode 20 (a portion of the second base portion 20A where it is disposed on the film 16, and the second extension portions 20B), and the heat generating body 22. The cover 28 is, for example, adhered to the back face of the mirror body 12 and fixed, thereby fixing the heater 14 to the back face of the mirror body 12.

Next, explanation follows regarding operation of the present exemplary embodiment.

In the heater 14 of the vehicle mirror 10 configured as described above, the power source applies the voltage between the first electrode 18 and the second electrode 20, thereby supplying current to the heat generating body 22 between the first extension portions 18B of the first electrode 18 and the second extension portions 20B of the second electrode 20, such that the heat generating body 22 generates heat. Accordingly, the heat generating body 22 heats the heated region 12A of the mirror body 12, and the temperature of the mirror body 12 rises. Frost and/or ice on the front face of the mirror body 12 (front face of the glass plate) is accordingly melted, and condensation and/or raindrops on the front face of the mirror body 12 are dried.

The time needed to melt frost on the front face of the mirror body 12 depends mainly on the time taken for the temperature to rise at the hottest portion of the mirror body 12. The time needed to dry condensation on the front face of the mirror body 12 depends mainly on the amount of heating per unit time of the mirror body 12.

Note that microcracks formed when cutting the glass plate are present at an outer peripheral portion of the glass plate of the mirror body 12. The mirror body 12 (glass plate) is vulnerable to cracking originating at such microcracks. On the other hand, even when the heat generating body 22 heats the heated region 12A of the mirror body 12, heat escapes through from outer peripheral end face of the mirror body 12, so, the temperature at the outer peripheral edge portion of the mirror body 12 does not readily rise.

The central side portion of the heat generating body 22 is configured by the thick portion 24, and the outer peripheral side portion of the heat generating body 22 is configured by the thin portion 26. The thin portion 26 has a smaller cross-sectional area perpendicular to the left-right direction (parallel to the first extension portions 18B and the second extension portions 20B), and has a greater resistance, than the thick portion 24. The thin portion 26 is accordingly supplied with a smaller current, and generates a smaller amount of heat, than the thick portion 24, so the heating density (amount of heating per unit surface area) of the mirror body 12 by the heat generating body 22 is lower at the outer peripheral side portion of the mirror body 12 than at the central side portion of the mirror body 12. The temperature rising of the mirror body 12 is therefore smaller at the outer peripheral side portion of the mirror body 12 than at the central side portion of the mirror body 12.

Accordingly, the temperature of the outer peripheral portion of the mirror body 12 can be suppressed from rising suddenly on progression from the outer peripheral side toward the central side of the mirror body 12 when the heat generating body 22 has heated the heated region 12A of the mirror body 12, thereby enabling stress arising in the outer peripheral portion of the mirror body 12 to be suppressed (reduced), and enabling cracks originating at the microcracks in the outer peripheral portion to be suppressed from forming in the mirror body 12 (glass plate).

The thick portion 24 has a large cross-sectional area perpendicular to the left-right direction, and has lower resistance. The current supplied to the thick portion 24 is accordingly larger, and the amount of heat generated is greater, such that the heating density is higher in the thick portion 24 at the central side portion of the mirror body 12.

The time taken for the temperature to rise (to, for example, a desired temperature) can accordingly be suppressed from increasing at the central side portion (where the highest temperature is obtained) of the mirror body 12, thereby enabling an increase in the time needed to melt frost on the front face of the mirror body 12 to be suppressed. Moreover, a reduction in the amount of heating per unit time in the mirror body 12 can be suppressed, thereby enabling an increase in the time needed to dry condensation on the front face of the mirror body 12 to be suppressed. A drop in the performance of the heater 14 can accordingly be suppressed.

As described above, in the heated region 12A of the mirror body 12, the thickness dimension of the heat generating body 22 is changed between the thick portion 24 and the thin portion 26, thereby changing the cross-sectional area of the heat generating body 22, perpendicular to the left-right direction, and changing the heating density by the heat generating body 22. The heating density of the mirror body 12 by the heat generating body 22 can accordingly be easily changed.

Note that in the present exemplary embodiment, the thin portion 26 is configured at the outer peripheral side portion of the heat generating body 22, such that the outer peripheral side portion of the heat generating body 22 has a uniform cross-sectional area perpendicular to the left-right direction at the outer peripheral side portion of the heat generating body 22 on progression from the central side toward the outer peripheral side of the mirror body 12, thereby giving a uniform heating density of the outer peripheral side portion of the mirror body 12 by the heat generating body 22 on progression from the central side toward the outer peripheral side of the mirror body 12. However, configuration may be made in which the cross-sectional area of the heat generating body 22, perpendicular to the left-right direction (in other words, in the exemplary embodiment, thickness dimension of the heat generating body 22) at the outer peripheral side portion of the heat generating body 22 gradually decreases, either in steps or continuously, on progression from the central side toward the outer peripheral side of the mirror body 12, such that the heating density of the outer peripheral side portion of the mirror body 12 by the heat generating body 22 gradually decreases, either in steps or continuously, on progression from the central side toward the outer peripheral side of the mirror body 12. So doing enables the temperature of the outer peripheral portion of the mirror body 12 to be effectively suppressed from rising suddenly on progression from the outer peripheral side toward the central side of the mirror body 12 when the heat generating body 22 has heated the heated region 12A of the mirror body 12, thereby enabling stress arising at the outer peripheral portion of the mirror body 12 to be effectively suppressed.

Second Exemplary Embodiment

Figure 2:
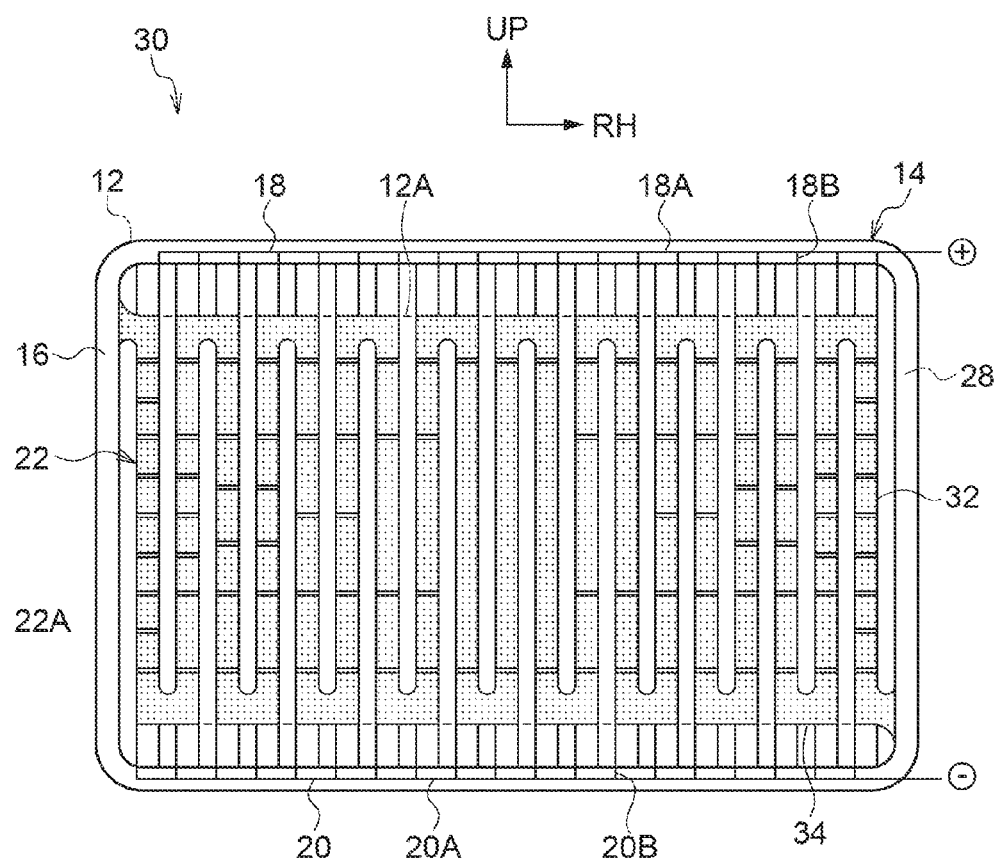
FIG. 2 is a face-on view illustrating a vehicle mirror according to a second exemplary embodiment, as viewed from the mirror-viewing side.

FIG. 2 is a face-on view illustrating a vehicle mirror 30, serving as a mirror according to a second exemplary embodiment of the present invention, as viewed from the mirror-viewing side.

The vehicle mirror 30 according to the present exemplary embodiment has substantially the same configuration as the first exemplary embodiment; however differs in the following respects.

As illustrated in FIG. 2, in the vehicle mirror 30 according to the present exemplary embodiment, the heat generating body 22 of the heater 14 is configured with a substantially wave shape as viewed face-on. The heat generating body 22 is provided with plural main body portions 32, and the plural main body portions 32 each extend in the up-down direction, and are disposed at uniform spacings (intervals) therebetween along the left-right direction. The heat generating body 22 is provided with plural coupling portions 34, and the coupling portions 34 couple together upper end portions or lower end portions of respective adjacent pairs of the main body portions 32 in the left-right direction. The coupling portions 34 that couple together upper end portions of adjacent pairs of the main body portions 32, and the coupling portions 34 that couple together lower end portions of adjacent pairs of the main body portions 32, are disposed alternately along the left-right direction, and gaps are formed between pairs of adjacent main body portions 32 and the coupling portions 34 coupling the pairs of main body portions 32 together. The main body portions 32 have a larger dimension in the left-right direction than the coupling portions 34.

The main body portion 32 is divided in the up-down direction by a specific number of segmentation portion(s). The segmentation portions of the main body portions 32 (portions where the heat generating body 22 is not provided) extend along the left-right direction. The main body portions 32 are accordingly each configured by plural configuration members 22A that are rectangular shaped as viewed face-on. The spacings (intervals) in the up-down direction between the segmentation portions adjacent in the up-down direction of the main body portions 32 gradually decreases on progression from the central side toward the outer peripheral side of the heat generating body 22, and up-down direction dimensions of the configuration members 22A gradually decrease, such that the cross-sectional areas of the configuration members 22A, perpendicular to the left-right direction (in other words, in the embodiment, areas of the configuration members 22A as viewed face-on) gradually decrease, on progression from the central side toward the outer peripheral side of the heat generating body 22.

The respective first extension portions 18B of the first electrode 18 are disposed at the back side of either the left end or the right end of the respective main body portions 32, and the respective second extension portions 20B of the second electrode 20 are disposed at the back side of the other of the left end or the right end of the respective main body portions 32. The left-right direction spacing between the first extension portion 18B and the second extension portion 20B between which the main body portion 32 is disposed is set larger than the left-right direction spacing between the first extension portion 18B and the second extension portion 20B between which the coupling portion 34 is disposed.

When the power source applies a voltage between the first electrode 18 and the second electrode 20, current is supplied to the heat generating body 22 (the main body portions 32 and the coupling portions 34) between the first extension portions 18B of the first electrode 18 and the second extension portions 20B of the second electrode 20, and the heat generating body 22 (the main body portions 32 and the coupling portions 34) generates heat. A region of the back face (plate face) of the mirror body 12 enclosing the heat generating portions of the heat generating body 22 (including the gaps if there are gaps present between heat generating portions) (a region enclosed by upper ends of the main body portions 32 and the upper side coupling portions 34, lower ends of the main body portions 32 and the lower side coupling portions 34, the left end of the leftmost main body portion 32, and the right end of the rightmost main body portion 32, on the back face (plate face) of the mirror body 12) configures the heated region 12A of the mirror body 12.

The up-down direction dimensions of the configuration members 22A of the heat generating body 22 decrease on progression from the central side toward the outer peripheral side of the heat generating body 22, and the configuration members 22A of the heat generating body 22 have decreasing cross-sectional areas perpendicular to the left-right direction (parallel to the first extension portions 18B and the second extension portions 20B) (have decreasing areas as viewed face-on) on progression from the central side toward the outer peripheral side, so increasing the resistance. The outer peripheral side portion of the heat generating body 22 is accordingly supplied with a smaller current, and generates a smaller amount of heat, than the central side portion of the heat generating body 22, such that the heating density (amount of heating per unit surface area) of the mirror body 12 by the heat generating body 22 is lower at the outer peripheral side portion of the mirror body 12 than at the central side portion of the mirror body 12, and the temperature rising of the mirror body 12 is smaller at the outer peripheral side portion of the mirror body 12 than at the central side portion of the mirror body 12.

Accordingly, the temperature of the outer peripheral portion of the mirror body 12 can be suppressed from rising suddenly on progression from the outer peripheral side toward the central side of the mirror body 12 when the heat generating body 22 has heated the heated region 12A of the mirror body 12, thereby enabling stress arising in the outer peripheral portion of the mirror body 12 to be suppressed (reduced), and enabling cracks originating at the microcracks in the outer peripheral portion to be suppressed from forming in the mirror body 12 (glass plate).

Moreover, the up-down direction dimensions of the configuration members 22A in the outer peripheral side portion of the heat generating body 22 gradually decrease on progression from the central side toward the outer peripheral side of the heat generating body 22, and at the outer peripheral side portion of the heat generating body 22, the cross-sectional area perpendicular to the left-right direction gradually decreases, and the resistance gradually increases, on progression from the central side toward the outer peripheral side of the heat generating body 22. Accordingly, at the outer peripheral side portion of the heat generating body 22, the current supplied gradually decreases, and the amount of heat generated gradually decreases, on progression from the central side toward the outer peripheral side of the heat generating body 22. Accordingly, at the outer peripheral side portion of the mirror body 12, the heating density of the mirror body 12 by the heat generating body 22 gradually decreases on progression from the central side toward the outer peripheral side of the mirror body 12, and the temperature rising of the outer peripheral side portion of the mirror body 12 gradually decreases on progression from the central side toward the outer peripheral side of the mirror body 12.

Accordingly, the temperature of the outer peripheral portion of the mirror body 12 can be effectively suppressed from rising suddenly on progression from the outer peripheral side toward the central side of the mirror body 12 when the heat generating body 22 has heated the heated region 12A of the mirror body 12, thereby enabling stress arising in the outer peripheral portion of the mirror body 12 to be effectively suppressed, and enabling cracks originating at the microcracks in the outer peripheral portion to be effectively suppressed from forming in the mirror body 12 (glass plate).

The configuration members 22A in the central side portion of the heat generating body 22 have larger up-down direction dimensions, such that the central side portion of the heat generating body 22 has a large cross-sectional area perpendicular to the left-right direction, and lower resistance. The current supplied to the central side portion of the heat generating body 22 is accordingly larger, and the amount of heat generated is greater, and hence the heating density by the heat generating body 22 is higher at the central side portion of the mirror body 12.

An increase in the time taken for the temperature to rise (to, for example, a desired temperature) can accordingly be suppressed at the central side portion (where the highest temperature is obtained) of the mirror body 12, thereby enabling an increase in the time needed to melt frost on the front face of the mirror body 12 to be suppressed. Moreover, a reduction in the amount of heating per unit time in the mirror body 12 can be suppressed, thereby enabling an increase in the time needed to dry condensation on the front face of the mirror body 12 to be suppressed. A drop in the performance of the heater 14 can accordingly be suppressed.

As described above, in the region corresponding to the heated region 12A of the mirror body 12, the up-down direction dimensions of the configuration members 22A of the heat generating body 22 are changed between the central side portion and the outer peripheral side portion of the heat generating body 22, thereby changing the cross-sectional area of the heat generating body 22 perpendicular to the left-right direction, and changing the heating density by the heat generating body 22. The heating density of the mirror body 12 by the heat generating body 22 can accordingly be easily changed.

Note that in the first exemplary embodiment and the second exemplary embodiment described above, the thickness dimension of the heat generating body 22 or the up-down direction dimensions of the configuration members 22A of the heat generating body 22 (in other words, a volume of the heat generating body 22 per unit surface area, which is viewed face-on, of the heat generating body 22) are changed so as to change the resistance of the heat generating body 22, thereby changing the heating density of the mirror body 12 by the heat generating body 22. However, configuration may be made in which gap dimensions between the first extension portions 18B of the first electrode 18 and the second extension portions 20B of the second electrode 20 are changed so as to change the resistance of the heat generating body 22, thereby changing the heating density of the mirror body 12 by the heat generating body 22. In such a case, the gap dimensions between the first extension portions 18B of the first electrode 18 and the second extension portions 20B of the second electrode 20 may be set larger at the outer peripheral side portion (FIG. 3A) of the heat generating body 22 than at the central side portion (FIG. 3B) of the heat generating body 22, so that the heating density of the mirror body 12 by the heat generating body 22 is lower at the outer peripheral side portion of the mirror body 12 than at the central side portion of the mirror body 12.

Further, in the first exemplary embodiment and the second exemplary embodiment described above, configuration may be made in which the thickness dimension of the heat generating body 22 or the up-down direction dimensions of the configuration members 22A of the heat generating body 22 being changed, and gap dimensions between the first extension portions 18B of the first electrode 18 and the second extension portions 20B of the second electrode 20 being changed, are combined so as to change the resistance of the heat generating body 22, thereby changing the heating density of the mirror body 12 by the heat generating body 22.

In the first exemplary embodiment and the second exemplary embodiment described above, the vehicle mirrors 10 and 30 are disposed at the exterior of the vehicle. However, the vehicle mirror 10 and 30 may be disposed at the interior of the vehicle.

What is claimed is:

1. A mirror comprising:
   a plate shaped mirror body; and
   a heating section that is configured to heat a heated region in a plate face of the mirror body, the heating section having dimensions corresponding to substantially an entire region of the plate face of the mirror body and the heated region being substantially the entire region of the plate face of the mirror body,
   wherein a heating density in the heated region of the mirror body is lower at an outer peripheral side of the mirror body than at a central side of the mirror body,
   further comprising:
   a heat generation body that is provided at the heating section that has dimensions corresponding to a substantially entire region of the plate face of the mirror body, and that generates heat so as to enable heating of the heated region of the mirror body,
   wherein a first resistance of a first portion of the heat generation body, the first portion corresponding to the heated region of the mirror body at the central side of the mirror body, is smaller than a second resistance of a second portion of the heat generation body, the second portion corresponding to the heated region of the mirror body at the outer peripheral side of the mirror body.

2. The mirror of claim 1, wherein, in the heated region of the mirror body, a cross-sectional area of the heat generation body is changed so as to change the heating density of the heating section.

3. The mirror of claim 2, further comprising: a pair of electrodes that are provided at the heating section, and that supply current to the heat generation body such that the heat generation body generates heat and heats the heated region of the mirror body, wherein the pair of electrodes have a space therebetween in the heated region of the mirror body, the space being changed so as to change an amount of heat generated by the heat generation body.

4. The mirror of claim 3, wherein, in the heated region of the mirror body, the heating density of the heating section gradually decreases on progression from the central side of the mirror body toward the outer peripheral side of the mirror body.

5. The mirror of claim 2, wherein, in the heated region of the mirror body, the heating density of the heating section gradually decreases on progression from the central side of the mirror body toward the outer peripheral side of the mirror body.

6. The mirror of claim 1, further comprising: a pair of electrodes that are provided at the heating section, and that supply current to the heat generation body such that the heat generation body generates heat and heats the heated region of the mirror body, wherein the pair of electrodes have a space therebetween in the heated region of the mirror body, the space being changed so as to change an amount of heat generated by the heat generation body.

7. The mirror of claim 6, wherein, in the heated region of the mirror body, the heating density of the heating section gradually decreases on progression from the central side of the mirror body toward the outer peripheral side of the mirror body.

8. The mirror of claim 1, wherein, in the heated region of the mirror body, the heating density of the heating section gradually decreases on progression from the central side of the mirror body toward the outer peripheral side of the mirror body.

9. The mirror of claim 1, wherein in a plane view of the plate face of the mirror body, the heated region of the mirror body at the central side of the mirror body includes a center of the plate face of the mirror body, and the heated region of the mirror body at the outer peripheral side of the mirror body surrounds the heated region of the mirror body at the central side of the mirror body.

10. The mirror of claim 1,
    wherein, in a plane view of the heat generation body, a per unit surface area of the heat generation body, a first volume of the first portion of the heat generation body is larger than a second volume of the second portion of the heat generation body.

11. The mirror of claim 10, wherein in a plane view of the plate face of the mirror body, the heated region of the mirror body at the central side of the mirror body includes a center of the plate face of the mirror body, and the heated region of the mirror body at the outer peripheral side of the mirror body surrounds the heated region of the mirror body at the central side of the mirror body.

12. The mirror of claim 10, further comprising a pair of electrodes that are provided at the heating section, and that supply current to the heat generation body such that the heat generation body generates heat and heats the heated region of the mirror body.

13. The mirror of claim 1, wherein in a plane view of the plate face of the mirror body, the heated region of the mirror body at the central side of the mirror body includes a center of the plate face of the mirror body, and the heated region of the mirror body at the outer peripheral side of the mirror body surrounds the heated region of the mirror body at the central side of the mirror body.

14. The mirror of claim 1,
wherein a first thickness of the first portion of the heat generation body is larger than a second thickness of the second portion of the heat generation body.

15. The mirror of claim 1, further comprising:
a pair of electrodes that are provided at the heating section, that supply current to the heat generation body such that the heat generation body generates heat and heats the heated region of the mirror body; and that include extension portions disposed so as to have a space therebetween; the space being changed so as to change an amount of heat generated by the heat generation body,
wherein a first space between the extension portions disposed at the first portion of the heat generation body is smaller than a second space between the extension portions disposed at the second portion of the heat generation body.

* * * * *